United States Patent [19]

Sherwin

[11] Patent Number: 4,515,432
[45] Date of Patent: May 7, 1985

[54] FIBER OPTICS HEAT FORMED ASSEMBLY

[75] Inventor: James S. Sherwin, Hillsborough, Calif.

[73] Assignee: National Semiconductor Corporation, Santa Clara, Calif.

[21] Appl. No.: 221,948

[22] Filed: Dec. 31, 1980

[51] Int. Cl.³ .............................................. G02B 7/26
[52] U.S. Cl. ................................... 350/96.20; 357/17
[58] Field of Search ................ 350/96.17, 96.20, 320, 350/96.21, 96.15; 250/227; 357/17, 19; 264/1.5

[56] References Cited

U.S. PATENT DOCUMENTS

| 3,932,761 | 1/1976 | Ramsey et al. | 350/96.21 X |
| 4,166,668 | 9/1979 | MacLeod | 350/96.20 |
| 4,192,574 | 3/1980 | Henry et al. | 350/96.17 |

FOREIGN PATENT DOCUMENTS 0010352 4/1980 European Pat. Off. ......... 350/96.20

OTHER PUBLICATIONS

Cerwin et al., "Dimpled Coupler for Fiber-Optic Bundles", *IEEE Trans. On Inst. & Meas.*, Jun. 1976, pp. 164-165.

Primary Examiner—John Lee
Attorney, Agent, or Firm—Gail W. Woodward; Paul J. Winters; Michael J. Pollock

[57] ABSTRACT

One end of a plastic optical fiber is attached to an LED by pressing a melted end of the optical fiber against the LED.

2 Claims, 1 Drawing Figure

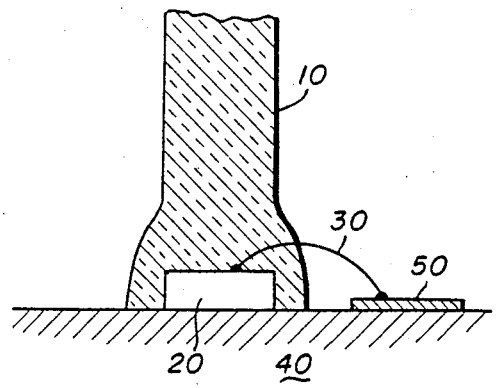
Fig_1

FIBER OPTICS HEAT FORMED ASSEMBLY

BACKGROUND OF THE INVENTION

1. Field of the Invention

The present invention relates generally to attaching a plastic optical fiber to a light emitting diode (LED) by melting the end of the fiber.

2. Description of the Prior Art

Prior art interconnects between optical fibers and light emitting diodes have been reviewed in "Fiber Optics Growing Strong," by Ohr and Adlerstein, Electronic Design, Nov. 8, 1979. These techniques generally use epoxy or some type of mechanical attachment to align the fiber with the LED. However, since it is difficult to accurately align the fiber close to the LED without a third material, such as the epoxy, being placed between the fiber and the LED, or scratching an optical surface or damaging the wire bond typically coupled to the LED, efficient interconnects have been difficult to achieve in a production environment.

SUMMARY OF THE INVENTION

An optical fiber interconnect comprises an optical fiber having one end melted for attachment to the light emitting surface of an LED.

BRIEF DESCRIPTION OF THE FIGURE

FIG. 1 is a cross section of an optical fiber attached to an LED by melting the end of the fiber.

DETAILED DESCRIPTION OF THE PREFERRED EMBODIMENT

FIG. 1 is a cross section of an optical fiber 10 attached to an LED 20 by melting the optical fiber 10, aligning it with the LED, pressing it against the LED, and cooling the LED/fiber combination. The melted fiber forms to the contours of the exposed surfaces of the LED and creates a strong mechanical coupling to the die and an efficient optical coupling to the emitting surface of the LED. In addition, the fiber encapsulates the wire bond 30 (anchored to an electrical conductor 50) which protects the wire and increases the strength of the mechanical bond.

Preferably the optical fiber is plastic and has a diameter of approximately 14 mils. The LED is attached to a substrate 40, is constructed from a semiconductor die, is square from the top and approximately 14 mils per side.

While the invention has been particularly taught and described with reference to the preferred embodiments, those versed in the art will appreciate that minor modifications in form and detail may be made without departing from the spirit and the scope of the invention. For example, the LED could be replaced by an optical detector such as a PIN diode. Accordingly, all such modifications are embodied within the scope of this patent as properly come within my contribution to the art and are particularly pointed out by the following claims.

I claim:

1. A fiber optical assembly comprising an optical fiber attached to an optical device by melting one end of the optical fiber, pressing the melted fiber against the optical device, and cooling the assembly.

2. A fiber optical assembly as in claim 1 wherein the optical fiber is plastic and the optical device is an LED.

* * * * *